E. CASSEL AND F. H. KUNKEL.
TIRE CASING CURING RIM.
APPLICATION FILED DEC. 13, 1919.
1,361,827.
Patented Dec. 14, 1920.
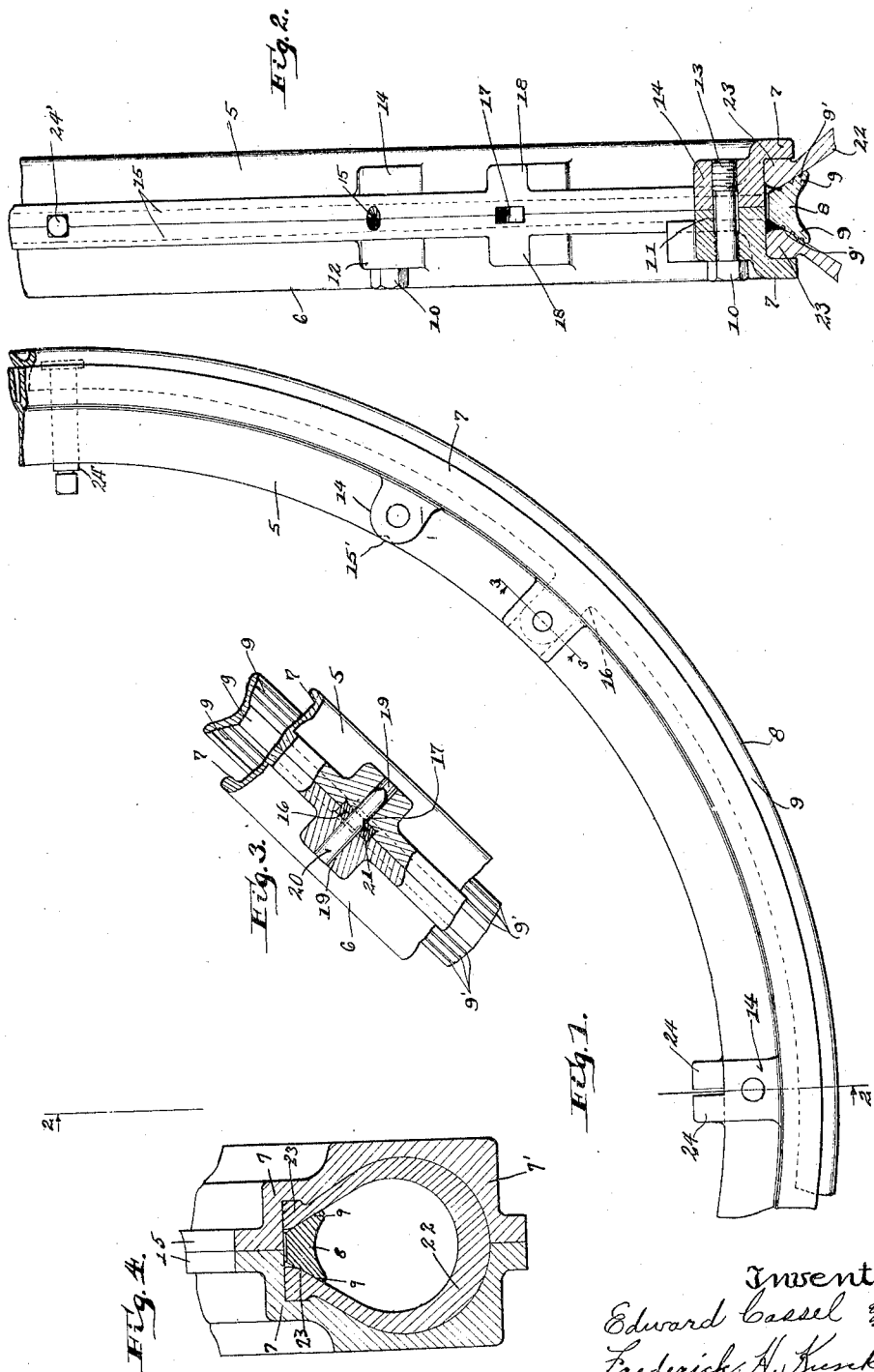

UNITED STATES PATENT OFFICE.

EDWARD CASSEL AND FREDERICK H. KUNKEL, OF MILWAUKEE, WISCONSIN.

TIRE-CASING-CURING RIM.

1,361,827.  Specification of Letters Patent.  Patented Dec. 14, 1920.

Application filed December 13, 1919. Serial No. 344,551.

*To all whom it may concern:*

Be it known that we, EDWARD CASSEL and FREDERICK H. KUNKEL, citizens of the United States, and residents of Milwaukee, in the county of Milwaukee and State of Wisconsin, have invented new and useful Improvements in Tire-Casing-Curing Rims, of which the following is a description, reference being had to the accompanying drawings, which are a part of this specification.

The present invention relates to certain new and useful improvements in tire casing curing rims especially adapted for use in connection with pneumatic automobile tire casings.

Heretofore, in curing pneumatic tire casings, an inner tube has been employed to inflate the casing and to hold the same in proper shape against the mold while being subjected to heat. This manner of curing has proven extremely costly in that the inner tube seldom lasts for more than three operations as the heat destroys its elasticity and the same is then rendered useless, and is absolutely incapable of being reclaimed.

Hence, with these and other inherent objections in mind, we have devised a novel form of curing rim which has for one object to provide means for forming the interior of the tire casing into an air tight chamber so that the same may be inflated without the necessity of employing an inner tube.

Another object of this invention is to provide a tire rim of the class described which may be employed either in connection with curing the tire or may be employed as a vehicle rim if so desired.

A further object of the present invention is to provide a tire curing rim of the class described composed of three parts having means for readily detaching and attaching said parts whereby the same may be used with ease and facility.

With the above and other objects in view which will appear as the description proceeds, our invention resides in the novel construction, combination and arrangement of parts substantially as hereinafter described and more particularly defined by the appended claims, it being understood that such changes in the precise embodiment of the herein described invention may be made as come within the scope of the claims.

In the accompanying drawing we have illustrated one complete example of the physical embodiment of our invention constructed according to the best mode we have so far devised for the practical application of the principles thereof, and in which:

Figure 1 is a side plan view of a portion of our novel form of tire curing rim, the rim being depicted as detached from the tire, with the parts in their coöperative positions.

Fig. 2 is a sectional view taken through Fig. 1 on the line 2—2.

Fig. 3 is a view part in section and part in elevation of a portion of our novel form of curing rim illustrating the manner of securing the tire bead engaging or binding ring to the rim proper, said view being taken on the plane indicated on the line 3—3 of Fig. 1, and Fig. 4 is a sectional view taken through a slightly modified form of my invention.

Referring now more particularly to the accompanying drawing, 5 and 6 designate like or complementary rim engaging members or annular ring sections having their portions 7 shaped to conform with the desired style of tire bead for which it may be desired; and 8 an annular binding ring or member adapted to be inserted between the beads of the tire being cured and having its side surfaces shaped as at 9 to assist the portions 7 of the members 5 and 6 and retaining the tire upon the rim as well as forming the interior of the tire secured thereto into an air tight chamber as will be later described.

The members 5 and 6 are adapted to be secured together by means of suitable securing bolts 10 which pass through a bore 11 of spaced lugs or projections 12 formed on the inner periphery of members 6, and said securing bolts have their threaded ends 13 engageable with a threaded bore, of lugs or projections 14 formed on the rim section 5. For the purpose of giving added strength to the members and to provide means for handling the rim, each member 5 and 6 is formed with an inwardly extending annular flange 15.

The binding ring 8 is secured in position by means of spaced inwardly projecting ears or lugs 16 formed on its inner periphery and adapted to be engaged in recesses 17 formed in inwardly projecting lugs 18 formed on the rim sections 5 and 6. The lugs 18 have alined apertures 19 therein for receiving a dowel pin 20 adapted to engage an aperture 21 in each lug 16 whereby said member 8 is held in proper position as will be readily apparent.

A tire casing 22 is positioned upon the rim as follows:

The sections 5 and 6 are separated and the tire casing 22 is placed thereon with one of its beads 23 engaging the rim portion 7 thereof, the member 8 is then placed in position with its lugs 16 registering with the recess 17 of said rim when the other rim section is placed in position and the threads 13 of the bolts 10 engage with the threaded bores of lugs 14. Before the bolts 10 are tightened the member 8 is properly positioned by driving the dowel pins 20 through the alined apertures 19 and 21, when the bolts 10 are tightened and the beads of the tire firmly clamped or secured between the adjacent binding member face and flange 7.

In order to insure the air tight joint bead the faces 9 of the member 8 and the beads of the tire casing, we provide the faces 9 of said member with series of annular grooves 9' so that the same will bite into the inner faces of the beads and insure a positive air tight joint.

To assist in assembling the rim sections the flanges 15, each have a recess 15' so the sections may be properly alined with the least trouble. Each rim section is also formed with an inner lug 24, the lugs being juxtapose each other so that a tool may be inserted therebetween to assist in separating the rim sections.

With the tire in position air is admitted to the interior of the casing to inflate the same through a valve 24' carried by the member 8 and projecting inwardly of the sections 5 and 6 through alined recesses formed therein. Thus from the foregoing description taken in connection with the accompanying drawing it will be at once apparent that we provide a tire curing rim in which the tire is secured thereto so that the same may be readily inflated without the necessity of employing an inner tube, which is extremely expensive, as before set forth.

In Fig. 4, we have illustrated the rim member 7 as shaped to form the sections of a tire inclosing mold 9' especially adapted for use in vulcanizing tires in the course of their manufacture.

What we claim as our invention is:

1. A tire casing curing rim comprising an annular rim member engageable with the beads of a tire casing, an annular binding member engageable with the inner faces of the casing beads to urge the beads outwardly to engagement with said rim member, and means providing an air tight connection between the inner faces of the beads and said binding member, said means including circumferentially extending channels into which the adjacent portions of the beads are forced.

2. A tire casing curing rim comprising an annular rim member having bead engaging flanges, and an annular binding member V-shape in cross section and engageable with the inner faces of the casing beads, and having grooves in each side face thereof, said binding member forcing the casing beads to engage the flange of the rim member.

3. A tire casing curing rim or mold comprising an annular rim member including two complementary sections, a bead engaging flange formed on the outer peripheral edge of each section, and means for securing said sections together, said rim member being adapted to receive a tire casing, an annular binding member V-shaped in cross section and engageable between the tire beads and the flange of the sections, the outer peripheral edge of said binding member providing an air tight joint between said member and the inner face of the air tight casing beads, inwardly projecting lugs carried by said binding member and engageable in recesses formed in said rim member, means carried by the rim member and engageable in apertures formed in said lugs to secure the binding member in position, and means permitting the inflation of the tire casing after being secured upon the rim member.

In testimony whereof, we affix our signatures.

EDWARD CASSEL.
FREDERICK H. KUNKEL.